June 16, 1925. 1,542,272

J. P. RAVELO

AUTOMOBILE BUMPER

Filed Nov. 24, 1923

Inventor:
J. P. Ravelo,

By Langner, Parry, Card & Langner

Att'ys.

Patented June 16, 1925.

1,542,272

UNITED STATES PATENT OFFICE.

JUAN P. RAVELO, OF HABANA, CUBA.

AUTOMOBILE BUMPER.

Application filed November 24, 1923. Serial No. 676,727.

*To all whom it may concern:*

Be it known that I, JUAN P. RAVELO, a citizen of Cuba, residing at Habana, Cuba, have invented certain new and useful Improvements in Automobile Bumpers, of which the following is a specification.

An object of the present invention is to provide a bumper, and means to attach the same to those automotive vehicles which are equipped with pneumatic tire carriers, which is the case with the majority of automobiles, and particularly those of the Ford type. From the foregoing it will be seen that my invention is not provided with a tire carrier, but utilizes that provided on the car.

Further objects of the invention are to improve the construction, decrease the cost, and increase the life and efficiency, of devices of this character.

The invention is illustrated in the accompanying drawings, is described in detail hereinafter, and the novel features are set forth in the appended claims.

Figure 1:
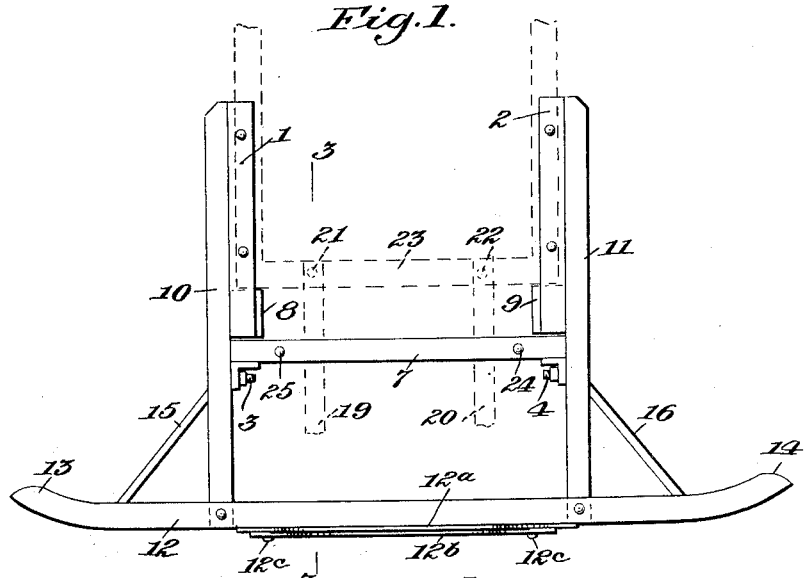
Fig. 1 is a plan view of the improved bumper.

Referring to the drawings, members 1 and 2, angular in section, are united to angle members 10 and 11, to which in turn is attached the beam 7, by bolts 3 and 4, which beam will be described more in detail hereinafter. In the framework formed by the members 1 and 2 and the beam 7 are provided buffer members 8 and 9, at the inner and rear part of the same which reinforce the bumper and operate to absorb shock due to slight bending of members 7, 10 and 11 under impact.

Figure 4:
Fig. 4 is a rear elevation of the device of Fig. 1.

The rear or outer ends of the angle members 10 and 11 are united by means of the transverse angle member 12, having curved ends 13 and 14. Arranged near said curved ends are braces 15 and 16, which connect said member 12 with the angle members 10 and 11 respectively. In order to increase the protection to the car I provide bumper elements 12ª and 12ᵇ, united to the transverse member 12 by means of bolts 12ᶜ, said bumper elements being curved in form as shown in Fig. 4.

Figure 2:
Fig. 2 is a detail of a member of the bumper, on which are provided means to facilitate its attachment to cars provided with tire carriers.
Figure 3:
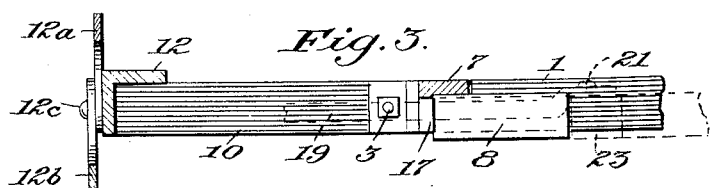
Fig. 3 is a detail section on line 3—3 of Fig. 1.

The beam 7, which is angular in cross section, is provided with notches 17 and 18 (Fig. 2) to receive arms 19 and 20 of a conventional tire carrier, said arms being attached at 21 and 22 to the chassis 23 of the machine.

The invention is applied in the following manner: To mount a bumper on a car provided with a tire carrier, the beam 7 is removed, if necessary or desirable, by means of bolts 3 and 4. With the bar 7 removed, the apparatus is mounted so that the angle members 1 and 2 rest on and receive the side members of the chassis, to which they are attached when in position by any appropriate means, and the beam 7 is then replaced in position as in Fig. 1, the arms 19 and 20 of the tire carrier being seated in the notches 17 and 18 of beam 7. The device is now ready for use.

The device as shown in the drawings is merely illustrative, and in no sense limiting.

I now claim:

1. A bumper for use on vehicles, comprising, a transverse beam, notches provided in the transverse beam for receiving arms of a tire carrier, a frame connected to said beam and positionable at the rear of the vehicle, and separate bumper elements connected to the frame and comprising two curved resilient members.

2. A vehicle bumper, comprising, lateral members attachable to the rear end of a vehicle, a member connected across the rear ends of the lateral members, a transverse beam connected across intermediate portions of the lateral members and notches cut in the transverse beam for receiving arms of a standard tire carrier.

3. A vehicle bumper, comprising, a frame attachable to the rear end of a vehicle, and a transverse notched beam attached to the frame for receiving arms of a standard tire carrier.

4. A vehicle bumper, comprising, a frame attachable to the rear end of a vehicle, a transverse notched beam attached to the frame for receiving arms of a standard tire carrier, and buffer members positioned at the ends, and inwardly of, the transverse notched beam.

In testimony whereof I have signed my name to this specification.

JUAN P. RAVELO.